United States Patent [19]
Smith et al.

[11] Patent Number: 5,785,472
[45] Date of Patent: Jul. 28, 1998

[54] CONVERTIBLE SUPPORT FOR A HEADER TRANSPORT WAGON

[75] Inventors: David R. Smith, Fort Jennings; William C. Maenle, Ottoville; Dennis J. Turnwald, Kalida, all of Ohio

[73] Assignee: Unverferth Manufacturing Co., Inc., Kalida, Ohio

[21] Appl. No.: 600,181

[22] Filed: Feb. 12, 1996

[51] Int. Cl.⁶ .................................................. B60P 3/00
[52] U.S. Cl. .................... 410/77; 410/2; 410/44; 410/156; 56/228
[58] Field of Search ........................ 410/2, 44, 45, 410/156, 8, 72, 77, 80; 248/674, 675, 228.2, 228.4, 309.1; 56/228, 473.5; 296/3; 280/789, 781, 656, 111

[56] References Cited

U.S. PATENT DOCUMENTS

| | | | |
|---|---|---|---|
| 4,184,694 | 1/1980 | Porter | 410/44 |
| 4,371,299 | 2/1983 | Cain et al. | 410/44 |
| 4,498,822 | 2/1985 | Diba | 410/2 |
| 4,770,577 | 9/1988 | Farris | 410/2 |
| 4,834,598 | 5/1989 | Bruns | 410/2 |
| 5,040,825 | 8/1991 | Kuhns | 280/789 |
| 5,333,904 | 8/1994 | Kuhns | 280/789 |
| 5,361,569 | 11/1994 | Schupman et al. | 56/228 |
| 5,374,082 | 12/1994 | Smith | 410/2 X |
| 5,529,447 | 6/1996 | Bruns et al. | 410/2 |

FOREIGN PATENT DOCUMENTS

| | | | |
|---|---|---|---|
| 2629822 | 1/1978 | Germany | 410/2 |

OTHER PUBLICATIONS

May-Wes™ Manufacturing, Inc., *The Farmer's Marketplace 1995-96 Agri Products Price Book*, p. 50 (1995).

*Primary Examiner*—Stephen T. Gordon
*Attorney, Agent, or Firm*—Rothwell, Figg, Ernst & Kurz, p.c.

[57] ABSTRACT

A transport wagon includes convertible support brackets for alternatively carrying different pieces of farm equipment, such as a grain platform or a corn header. Each convertible support bracket has a first support member pivotally connected to a second support member. The first support member has a support surface and can move between a first position for supporting part of an article to be carried and a second position for allowing the second support member, which has a support surface, to support part of a different article to be carried. The brackets can be slidably mounted on the frame of the transport cart. The brackets can be moved to one position for transporting a first article such as a grain platform. The brackets also can be moved to a second position for transporting a second article such as a corn header.

15 Claims, 6 Drawing Sheets

1

CONVERTIBLE SUPPORT FOR A HEADER TRANSPORT WAGON

BACKGROUND OF THE INVENTION

1. Field of Invention

The invention relates generally to a support bracket for a header transport wagon. These wagons are used to transport various pieces of farm equipment.

2. Description of Related Art

Header transport wagons are well known in the art. They are generally used to transport farm equipment attachments. These transport wagons include some type of supporting means for supporting a portion of an article to be carried. In the past, each transport wagon was designed to haul a specific type of article. For example, a grain platform requires different wagon supports than a corn header.

There remains a need in the art for improvements in wagons for transporting farm equipment.

SUMMARY OF THE INVENTION

In accordance with the present invention, a convertible support bracket comprises a first support member pivotally connected to a second support member. The first support member has a support surface and can move between a first position for supporting a portion of a first article to be carried and a second position for allowing the second support member, which has a support surface, to support a portion of a second article to be carried. In the first position, the first support member overlies the second support member. In the second position, the first support member is out of the way of the second support member.

DETAILED DESCRIPTION OF THE PREFERRED EMBODIMENTS

Figure 1:
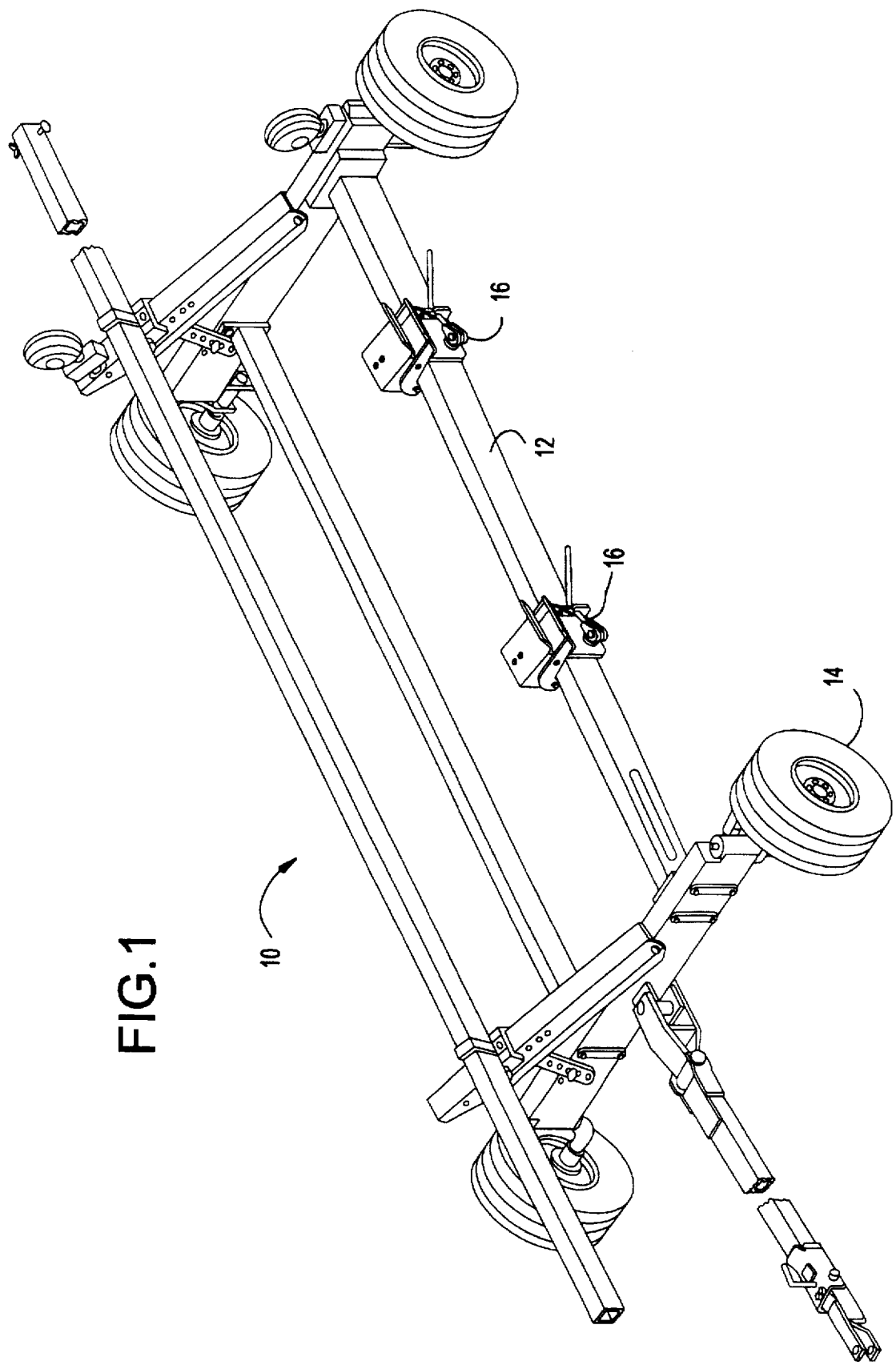
FIG. 1 is an environmental view of a convertible support bracket, according to the invention, in place on a header transport wagon.

Referring to FIG. 1, there is shown a header transport wagon (hereinafter wagon) indicated generally at 10. These wagons may be towed by a motor vehicle such as a truck or tractor (not shown), and are commonly used to transport different pieces of farm equipment, such as grain platforms or corn headers, at different times. The wagon 10 shown includes a frame 12 on wheels 14 and two convertible support brackets 16 (hereinafter bracket), in accordance with the invention, connected to the frame 12. In the embodiment shown, each bracket 16 is capable of supporting either a portion of a grain platform or a corn header, depending on which is being transported, while another part of the frame 12 supports the remaining weight of the particular piece of farm equipment being carried.

Figure 2:
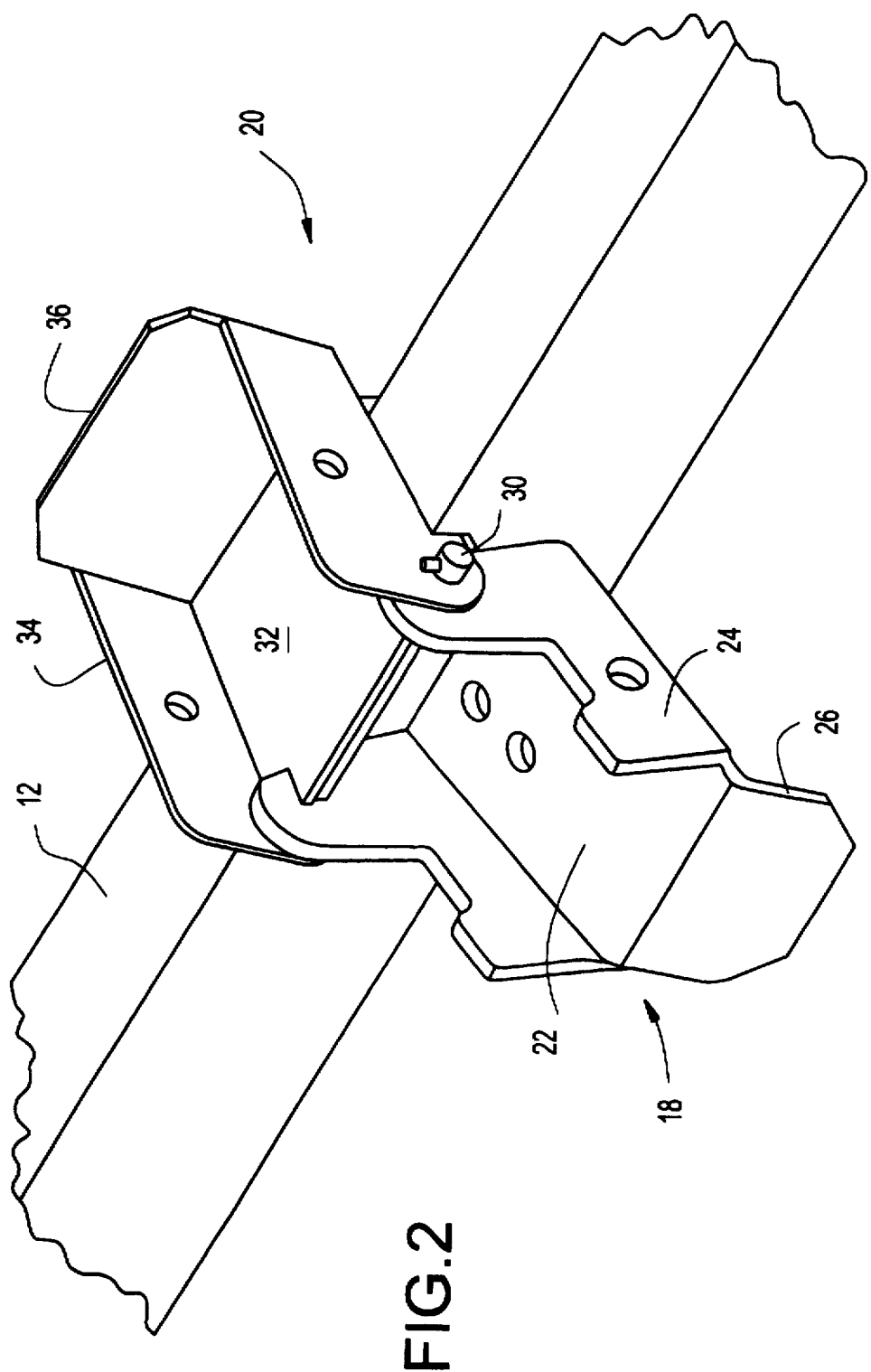
FIG. 2 is a perspective view of the convertible support bracket shown in FIG. 1 with the first support member in the lower position.

Referring to FIG. 2, the bracket 16 includes a first support member 18, a second support member 20, and a hinge 30. The first support member 18 is mounted to the second support member 20 by the hinge 30 so that the first support member 18 can alternately be moved between one of two positions. In the lower position, as shown in FIG. 2, the second support member 20 provides a second support surface for supporting a corn header while the first support member 18 is below the level of second support member 20. In the upper position, as shown in FIG. 3, the first support member 18 overlies the second support member 20, and provides a first support surface for supporting a grain platform while the second support member 20 holds the first support member 18 in place.

Figure 3:
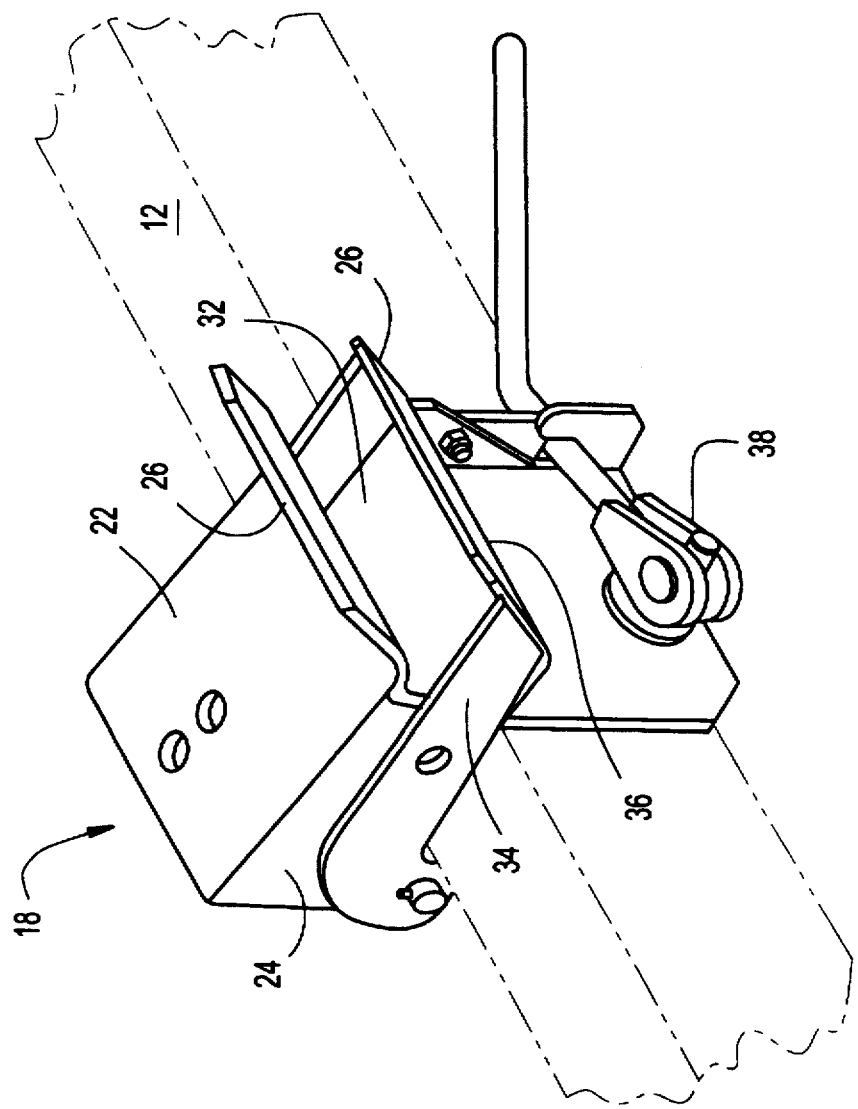
FIG. 3 is a perspective view of the convertible support bracket shown in FIG. 1 with the first support member in the upper position.
Figure 4:
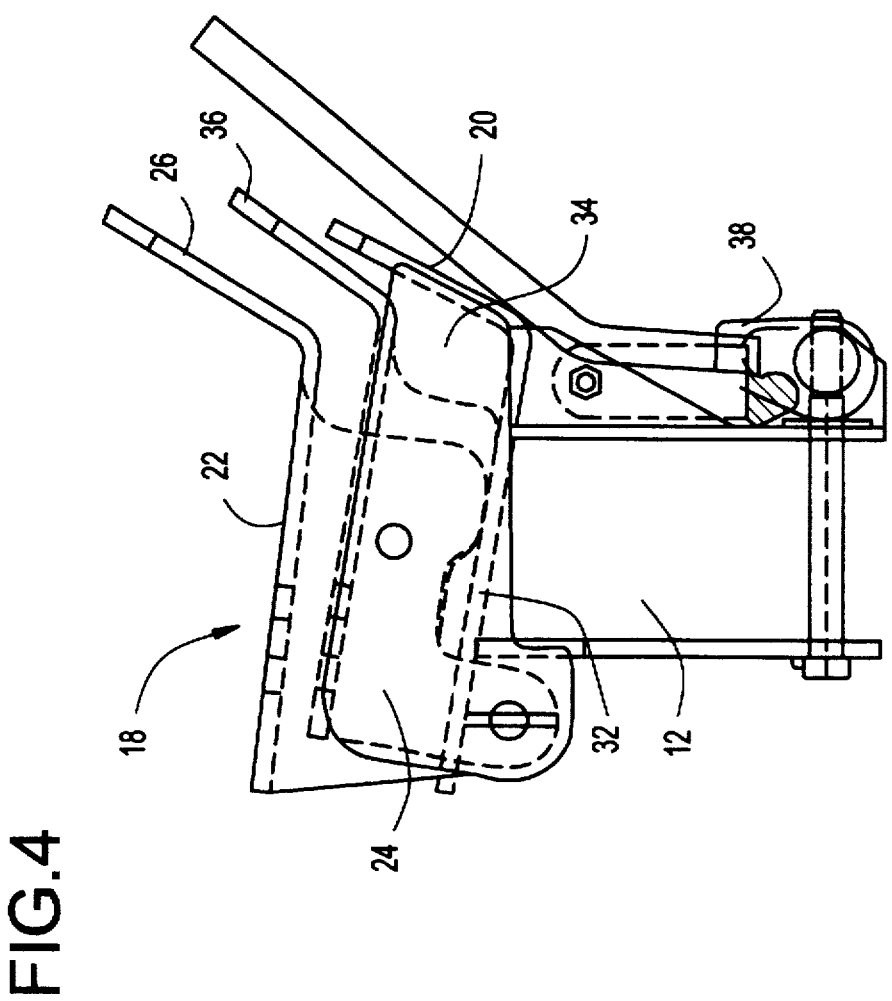
FIG. 4 is a side view of the convertible support bracket shown in FIG. 1.

Referring to FIG. 3, in the preferred embodiments, the first support member 18 includes a bottom 22, two sides 24, and a riser 26. The riser 26 rises up from one surface of the bottom 22 while the sides extend down from the other surface. Riser 26 forms an obtuse angle with the top surface of the wagon frame 12. The sides 24 each contain one opening 28 (shown in FIG. 5) for allowing a pin 30 to be placed through each side 24. In the upper position, one surface of the bottom 22 and the riser 26 provide support for the grain platform. The top of the frame 12 is substantially parallel with the horizon or the traveling surface. Referring to FIG. 4, when the first support member is in the upper position, the bottom 22 makes an angle with the top of the frame 12 which is between about 5 degrees and about 15 degrees, preferably about 10 degrees.

Referring to FIG. 2, in the preferred embodiment, the second support member 20 includes a bottom 32, two sides 34, a riser 36, and a mechanism 38 (shown in FIG. 3) for slidably connecting the bracket 16 to the frame 12. The sides 34 each have an opening 40 FIG. 5. The pin 30 extends through the openings 40 in the sides 34 of the second support member 20 and the openings 28 in the sides 24 of the first support member 18 so that the first support member 18 is pivotally connected to the second support member 20. The riser 36 and the sides 34 all extend from the same surface of the bottom 32. Riser 36 forms an obtuse angle with the top surface of wagon frame 12. The bottom 32, riser 36, and sides 34 form a pocket for receiving and supporting part of a corn header housing, so as to prevent shifting of the corn header during transport. Referring to FIG. 4, the top of the frame 12 is substantially parallel with the horizon or the traveling surface. The bottom 32 makes an angle with the top of the frame 12 which is between about 5 degrees and about 15 degrees, preferably about 10 degrees.

Figure 5:
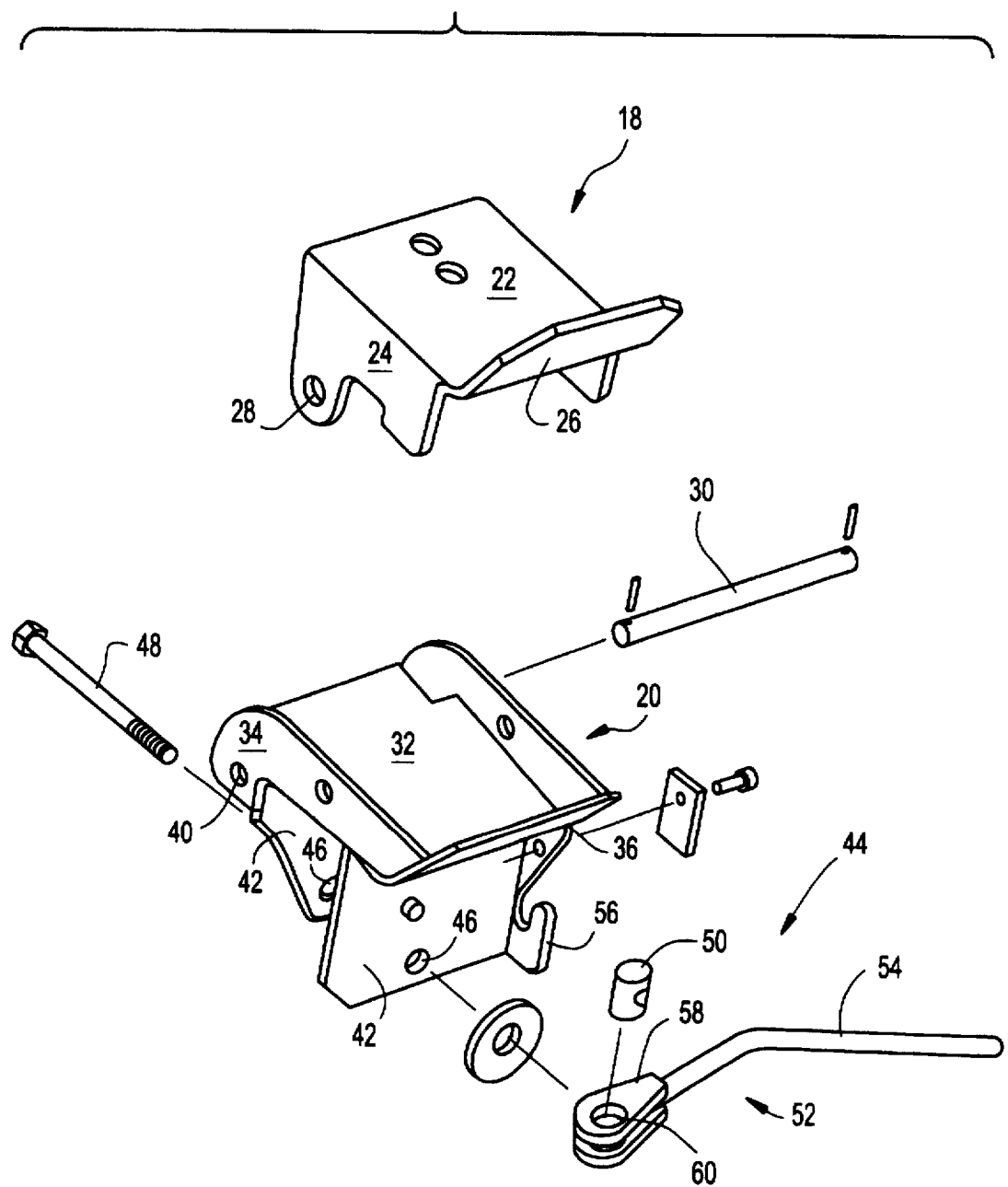
FIG. 5 is an exploded view of a slidable connection means of the support bracket shown in FIG. 1.

Referring to FIG. 5, in the preferred embodiments, provision is made for slidably connecting the second support member 20 to the frame 12 (shown in FIG. 5), which includes two plates 42 and a quick release device comprising a set/release cam 44. The two plates 42 extend from the bottom 32 of the second support member 20 in the opposite direction from the sides 34. The plates 42 extend as shown, so that the frame 12 is surrounded on three sides. The first and second sides by the plates 42 and the third side by the bottom 32 of the second support member 20. Each plate 42 has an opening 46 for receiving a bolt 48. The bolt 48 extends through each opening 46 so that the frame 12 is completely surrounded.

In the embodiment shown, the set/release cam 44 includes a barrel shaped nut 50, a cam member 52, a handle 54, and a retaining slot 56. The cam member 52 consists of two cam shaped plates 58 attached to the end of the handle 54. The cam shaped plates 58 have openings 60 for receiving the barrel shaped nut 50. The barrel shaped nut 50 is fitted into the openings 60 of the cam member 52. The nut 50 is then screwed into place on the bolt 48. The retaining slot 56 is a plate with a notch that extends perpendicularly from same side of plate 42 in which the handle 54 attaches.

As the handle 54 is moved toward the frame 12, the cam member 52 engages one plate 42 while the bolt 48 engages the other plate 42 so that the plates are pulled toward each other. This causes the plates 42 to frictionally engage the frame 12. The handle 54 then is placed within the retaining slot 56. In this position, the second support member 20 is now locked in place on the frame 12. It can thus be seen that the second support member 20 includes a second base 32 and two plates 42 connected to base 32 on opposite sides of the base and extending downwardly from the base, so as to be mountable on the frame 12 with the second base resting on the top surface of frame 12 and the two plates 42 extending adjacent the side surfaces of frame 12. As indicated above, the quick release device includes bolt 48 extending below the bottom of frame 12 for mounting the bracket on frame 12, with bolt 48 connected to both of plates 42 below the bottom of frame 12. As shown in FIGS. 3, 4 and 5, one end of the bolt is connected to cam member 52 having handle 54 attached to the cam member. Handle 54 is movable from an unlocked position wherein the bracket is slidable on frame 12, to a locked position, shown in FIG. 3, wherein the cam member engages a respective one of the side plates 42 so that both plates 42 are pulled toward each other for frictionally engaging frame 12.

Figure 6:
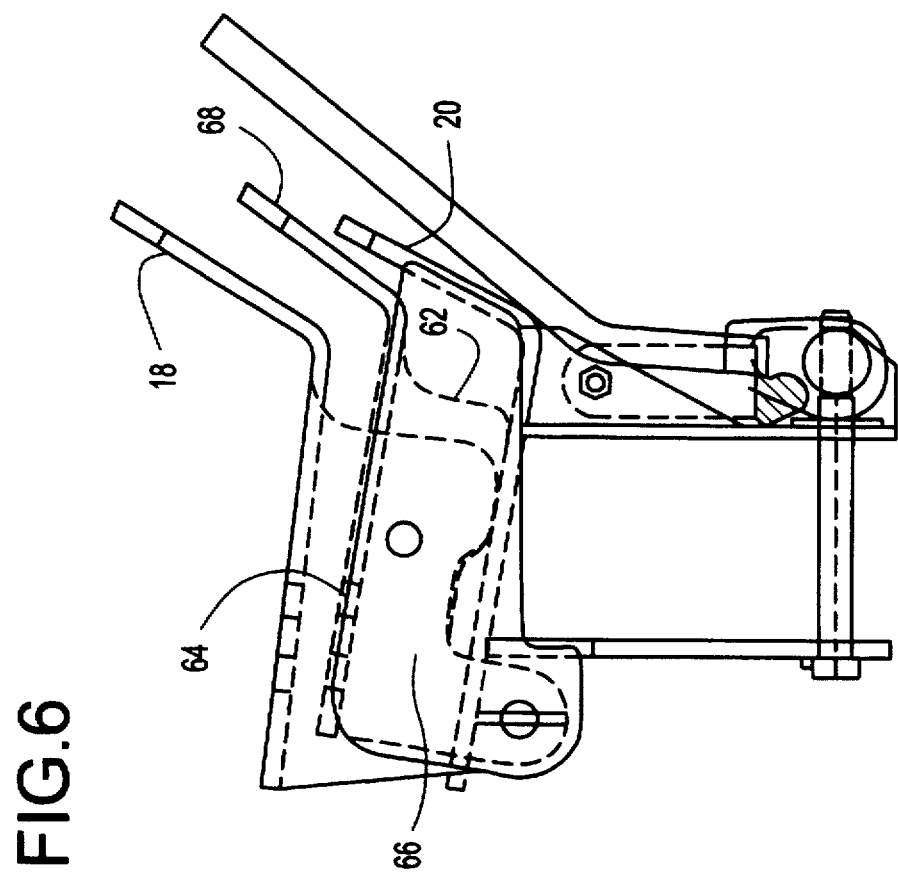
FIG. 6 is a side view of the second embodiment of the convertible support bracket shown in FIG. 1.

In a second embodiment shown in FIG. 6, the bracket 16 includes a third support member 62 which, as with the first support member 18, includes a bottom 64, two sides 66, and a riser 68.

The third support member 62 is hinged to the second support member 20 between the first support member 18 and the second support member 20, and is pivotable between a mid-lower position and a mid-upper position. In the mid-upper position, the third support member 62 can support a third article to be carried when the first support member 18 is in the lower position. According to this embodiment, when the first support member 18 is in the upper position, the third support member 62 is unused and covered by the first support member 18.

To expose the second support member 20 for use thereof according to this embodiment, the first support member 18 is pivoted to the lower position and the third support member 62 is pivoted to the mid-lower position on top of the first support member 18.

With this embodiment, the sides 66 of the third support member 62 are shorter than the sides 24 of the first support member 18 so that the height of the support surface provided by the third support member 62 is lower than the height of the support surface provided by the first support member 18.

With this embodiment, the bracket 16 can support a greater variety of grain platforms.

Many modifications, variations, and changes in detail may be made to the described embodiment, and it is intended that the matter in the foregoing description and shown in the accompanying drawings be interpreted as illustrative and not in a limiting sense.

What is claimed is:

1. A convertible support bracket for a transport wagon having a frame with a top surface, opposed frame side surfaces and a frame bottom, comprising:

a first support member having a first support surface for supporting a portion of a first article to be transported;

a second support member having a second support surface for supporting a portion of a second article to be transported and for mounting to the frame of the transport wagon;

the first support member pivotally connected to the second support member for movement between a lower position wherein the second support surface is positioned for supporting said portion of said second article to be transported and an upper position wherein the first support member overlies the second support member, and wherein the first support surface is positioned for supporting said portion of said first article to be transported;

the second support surface including a base and two plates connected to the base on opposite sides of the base and extending downwardly from the base, so as to be mountable on said frame with said base resting on the top surface of said frame, and said two plates extending adjacent said frame side surfaces; and a quick release device comprising a bolt extendible below the frame bottom for mounting said bracket on said frame, with said bolt connected to both said plates below the frame bottom, said bolt having one end connected to a cam member with a handle attached to the cam member, the handle being movable from an unlocked position wherein the bracket is slidable on the frame to a locked position wherein the cam member engages a respective one of said plates so that both said plates are pulled toward each other for frictionally engaging said frame.

2. The convertible support bracket of claim 1, wherein the first support surface includes a first base and a first riser connected to the first base and extending upwardly from the first base.

3. The convertible support bracket of claim 2, wherein the second support surface includes said second support member base and a second riser connected to the second support member base and extending upwardly from the second support member base.

4. The convertible support bracket of claim 2, wherein the first base is mountable on said frame so as to be out of parallel with the top surface of the frame when the first support member is in the upper position.

5. The convertible support bracket of claim 2, wherein the first base is mountable on said frame so as to form an acute angle with the top surface of the frame when the first support member is in the upper position.

6. The convertible support bracket of claim 2, wherein the first riser is mountable on said frame so as to form an obtuse angle with the top surface of the frame when the first support member is in the upper position.

7. The convertible support bracket of claim 3, wherein the first base is mountable on said frame so as to be out of parallel with the top surface of the frame when the first support member is in the upper position.

8. The convertible support bracket of claim 7, wherein the second support member base is mountable on said frame so as to be out of parallel with the top surface of the frame.

9. The convertible support bracket of claim 3, wherein the first base is mountable on said frame so as to form an acute angle with the top surface of the frame when the first support member is in the upper position.

10. The convertible support bracket of claim 9, wherein the second support member base is mountable on said frame so as to form an acute angle with the top surface of the frame.

11. The convertible support bracket of claim 10, wherein the first riser is mountable on said frame so as to form an obtuse angle with the top surface of the frame when the first support member is in the upper position and the second riser is mountable on said frame so as to form an obtuse angle with the top surface of the frame.

12. The convertible support bracket of claim 3, wherein the second support surface further includes first and second sides connected to opposite sides of the base of the second support member and extending upwardly from the second support member so as to define a pocket for supporting said portion of said second article to be transported.

13. The convertible support bracket of claim 7, wherein the second support surface further includes first and second sides connected to opposite sides of the base of the second support member and extending upwardly from the second support member so as to define a pocket for supporting said portion of said second article to be transported.

14. The convertible support bracket of claim 1, further comprising a third support member having a third support surface for supporting a portion of a third article to be transported, the third support member pivotally connected to the second support member for movement between a mid-lower position wherein the second support surface is positioned for supporting said portion of said second article to be transported while the first support member is in the lower position under the third support member, and a mid-upper position wherein the third support member overlies the second support member, wherein the first support member is in the lower position, and wherein the third support surface is positioned for supporting said portion of said third article to be transported.

15. A convertible support bracket for a transport wagon having a frame with a top surface, comprising:

a first support member having a first support surface for supporting a portion of a first article to be transported;

a second support member having a second support surface for supporting a portion of a second article to be transported and for mounting to the frame of the transport wagon; and the first support member pivotally connected to the second support member by a pivot for movement between a lower position wherein the second support surface is positioned for supporting said portion of said second article to be transported and an upper position wherein the first support member overlies the second support member, and wherein the first support surface is positioned for supporting said portion of said first article to be transported;

wherein the first support surface includes a first base and a first riser connected to the first base and extending upwardly from the first base;

wherein the second support surface includes a second base and further includes a second riser connected to the second base on an opposite side of said second base from said pivot and extending upwardly from the second base;

wherein the second support member further includes first and second sides connected to opposite sides of the second base of the second support member, each of the first and second sides extending between said second riser and said pivot, and extending upwardly from the second base so as to define a pocket for supporting said portion of said second article to be transported.

* * * * *